(12) United States Patent
Vasseur et al.

(10) Patent No.: US 10,318,887 B2
(45) Date of Patent: Jun. 11, 2019

(54) DYNAMIC APPLICATION DEGROUPING TO OPTIMIZE MACHINE LEARNING MODEL ACCURACY

(71) Applicant: Cisco Technology, Inc., San Jose, CA (US)

(72) Inventors: Jean-Philippe Vasseur, Anchorage, AK (US); Pierre-André Savalle, Rueil-Malmaison (FR); Alexandre Honoré, Schaerbeek (BE)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 15/188,140

(22) Filed: Jun. 21, 2016

(65) Prior Publication Data

US 2017/0279696 A1    Sep. 28, 2017

Related U.S. Application Data

(60) Provisional application No. 62/312,551, filed on Mar. 24, 2016.

(51) Int. Cl.
G06F 15/173    (2006.01)
G06N 20/00    (2019.01)
H04L 12/24    (2006.01)
H04L 12/26    (2006.01)

(52) U.S. Cl.
CPC .......... G06N 20/00 (2019.01); H04L 41/142 (2013.01); H04L 43/062 (2013.01); H04L 43/50 (2013.01); H04L 43/14 (2013.01)

(58) Field of Classification Search
CPC ....... H04L 43/14; H04L 43/50; H04L 41/142; G06N 99/005

USPC .................................................. 709/223–226
See application file for complete search history.

(56) References Cited

U.S. PATENT DOCUMENTS

| | | | |
|---|---|---|---|
| 7,712,134 B1* | 5/2010 | Nucci | H04L 63/145 713/172 |
| 8,079,080 B2* | 12/2011 | Borders | G06F 21/552 709/223 |
| 8,352,630 B2 | 1/2013 | Hart | |
| 9,276,877 B1* | 3/2016 | Chua | H04L 45/02 |
| 10,116,674 B2* | 10/2018 | Baradaran | H04L 63/1425 |
| 2006/0020924 A1 | 1/2006 | Lo et al. | |
| 2014/0304402 A1* | 10/2014 | Prakash | H04L 43/10 709/224 |
| 2015/0161386 A1 | 6/2015 | Gupta et al. | |

(Continued)

Primary Examiner — Bharat Barot
(74) Attorney, Agent, or Firm — Behmke Innovation Group LLC; James Behmke; Stephen D. LeBarron

(57) ABSTRACT

In one embodiment, a device in a network identifies a plurality of applications from observed traffic in the network. The device forms two or more application clusters from the plurality of applications. Each of the application clusters includes one or more of the applications, and wherein a particular application in the plurality of applications is included in each of the application clusters. The device generates anomaly detection models for each of the application clusters. The device tests the anomaly detection models, to determine a measure of efficacy for each of the models with respect to traffic associated with the particular application. The device selects a particular anomaly detection model to analyze the traffic associated with the particular application based on the measures of efficacy for each of the models.

20 Claims, 19 Drawing Sheets

(56) References Cited

U.S. PATENT DOCUMENTS

| | | |
|---|---|---|
| 2015/0382436 A1 | 12/2015 | Kelly et al. |
| 2016/0078347 A1 | 3/2016 | Salajegheh et al. |
| 2017/0126709 A1* | 5/2017 | Baradaran ........... H04L 63/1416 |
| 2017/0126718 A1* | 5/2017 | Baradaran ........... H04L 63/1425 |

* cited by examiner

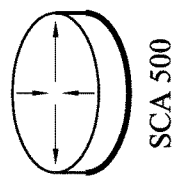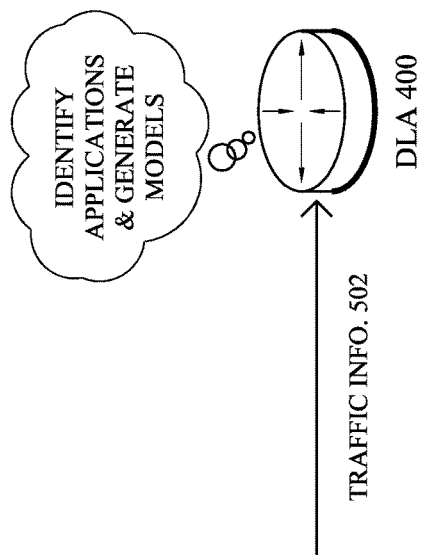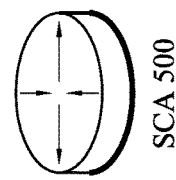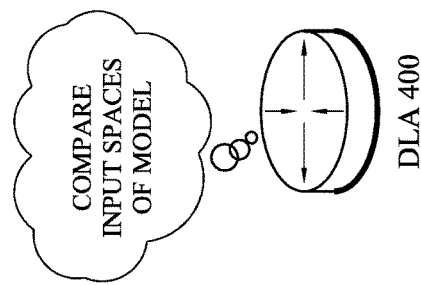

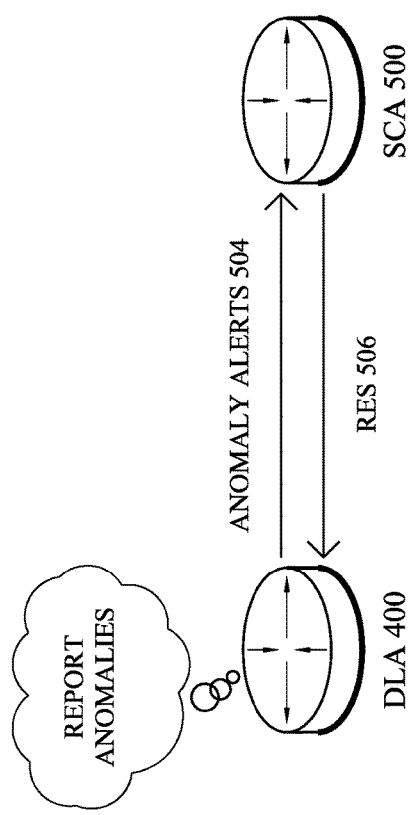
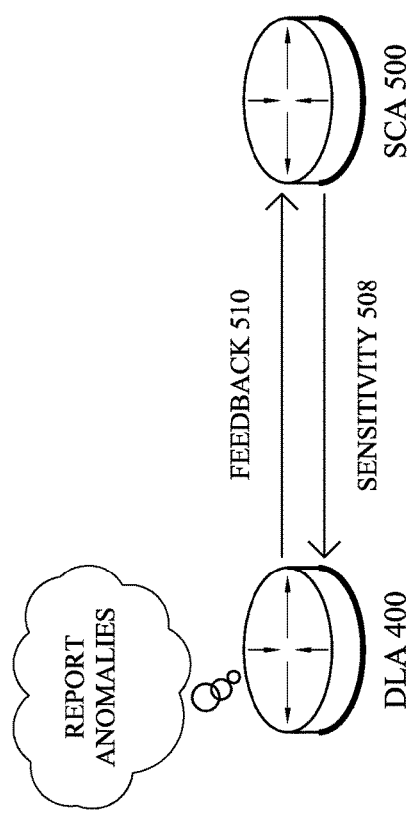
FIG. 5C
FIG. 5D

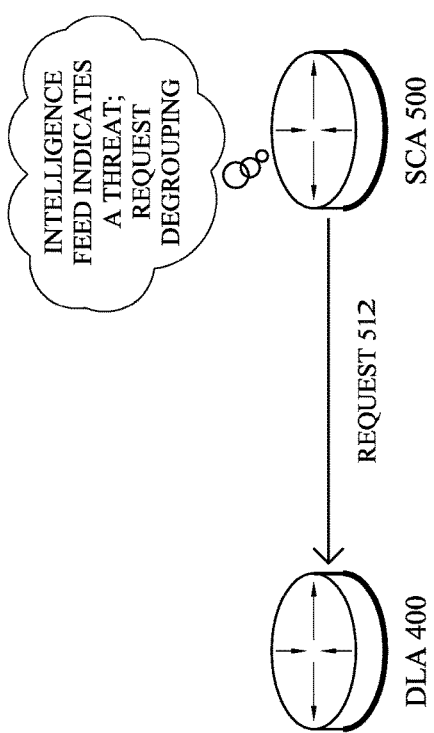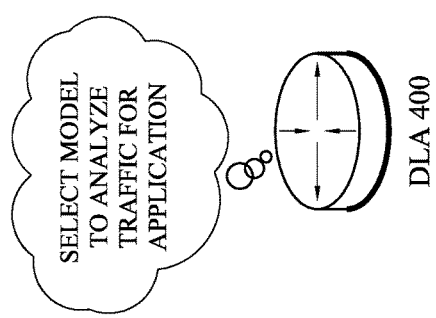
FIG. 5E
FIG. 5F

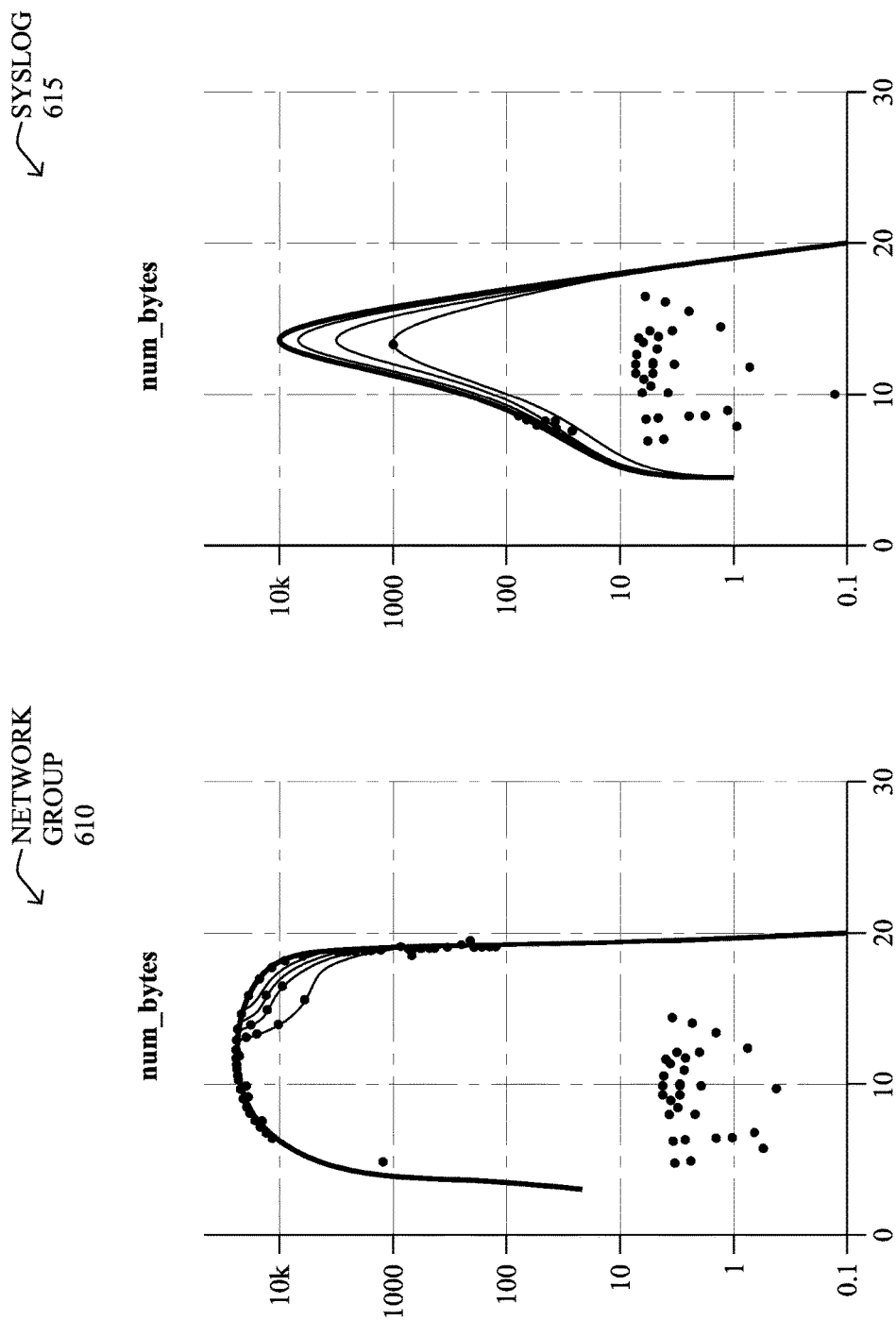

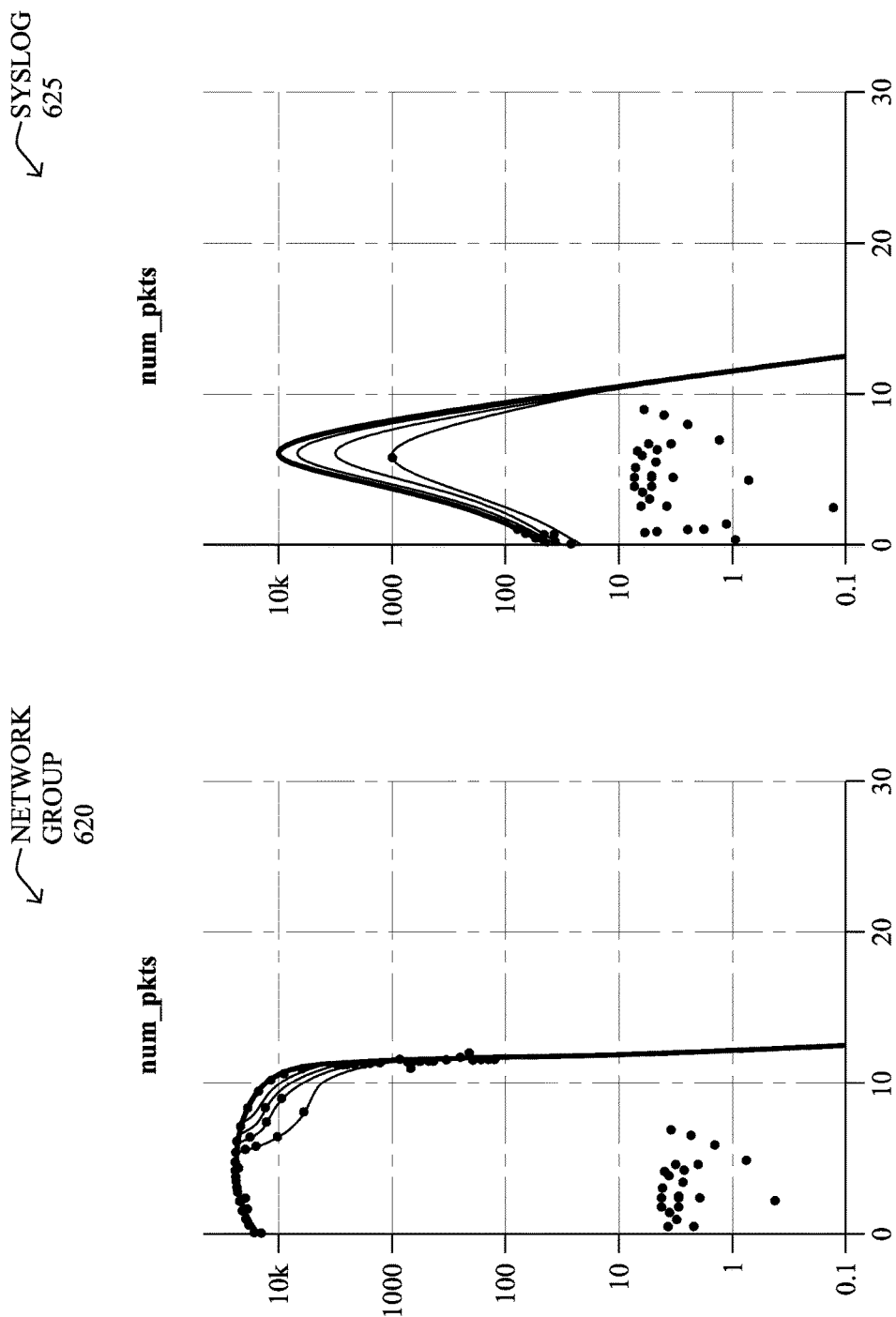

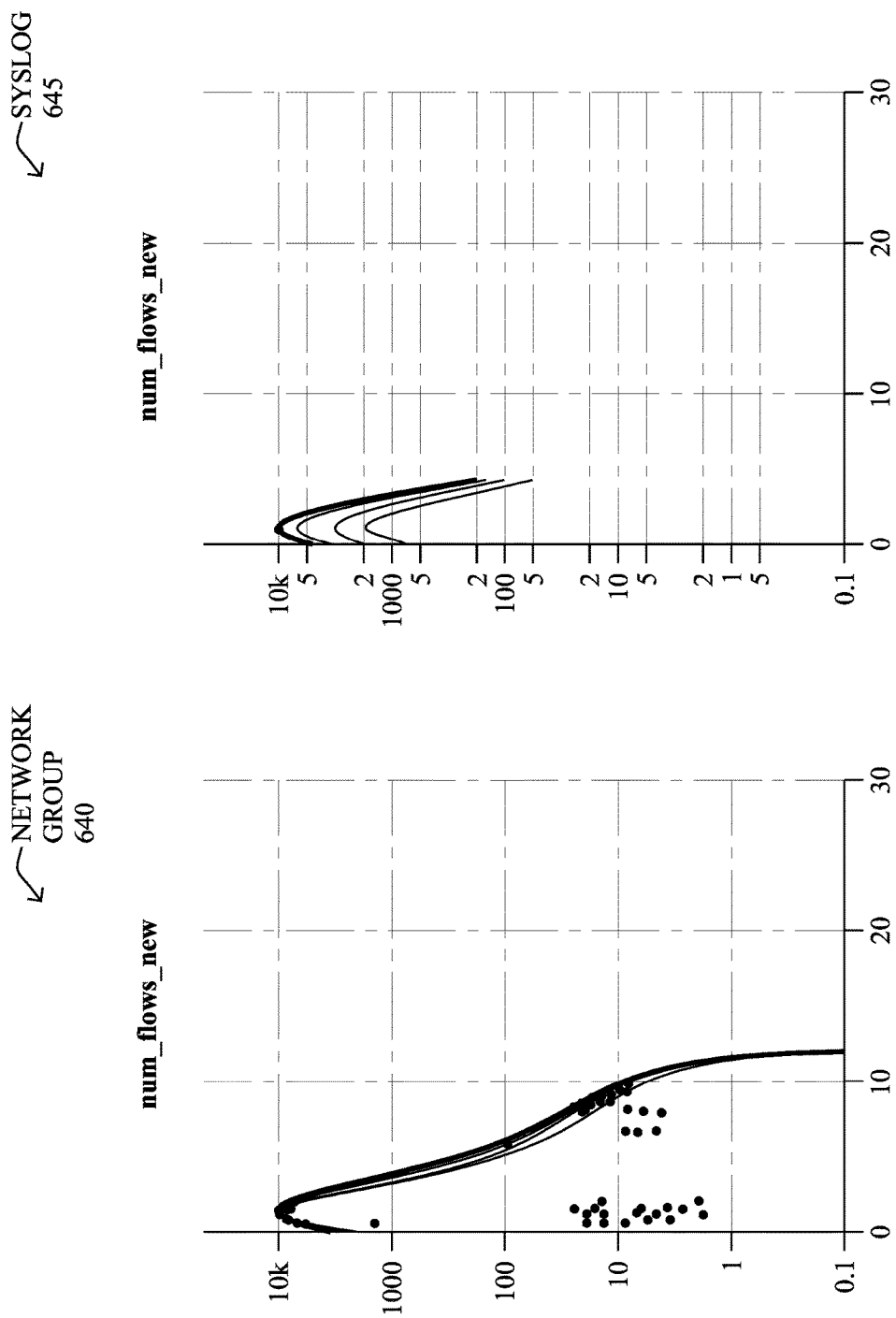

DYNAMIC APPLICATION DEGROUPING TO OPTIMIZE MACHINE LEARNING MODEL ACCURACY

RELATED APPLICATION

This application claims priority to U.S. Provisional Application No. 62/312,551, filed on Mar. 24, 2016, entitled DYNAMIC APPLICATION DEGROUPING TO OPTIMIZE MACHINE LEARNING MODEL ACCURACY, by Vasseur, et al., the contents of which are incorporated herein by reference.

TECHNICAL FIELD

The present disclosure relates generally to computer networks, and, more particularly, to the dynamic degrouping of application groups to optimize machine learning model accuracy.

BACKGROUND

Generally, Internet Behavioral Analytics (IBA) refers to the use of advanced analytics coupled with various networking technologies, to detect anomalies in a network. Such anomalies may include, for example, network attacks, malware, misbehaving and misconfigured devices, and the like. For example, the ability to model the behavior of a device (e.g., a host, networking switch, router, etc.) allows for the detection of malware, which is complimentary to the use of firewalls that use static signatures for detection. Observing behavioral changes (e.g., deviations from a modeled behavior) using flows records, deep packet inspection, and the like, allows for the detection of an anomaly such as a horizontal movement (e.g. propagation of malware in the network) or an attempt to perform information exfiltration, prompting the system to take remediation actions, automatically.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate an example of a DLA selecting a model to analyze traffic for a particular application;

DESCRIPTION OF EXAMPLE EMBODIMENTS

Overview

Figure 1A:
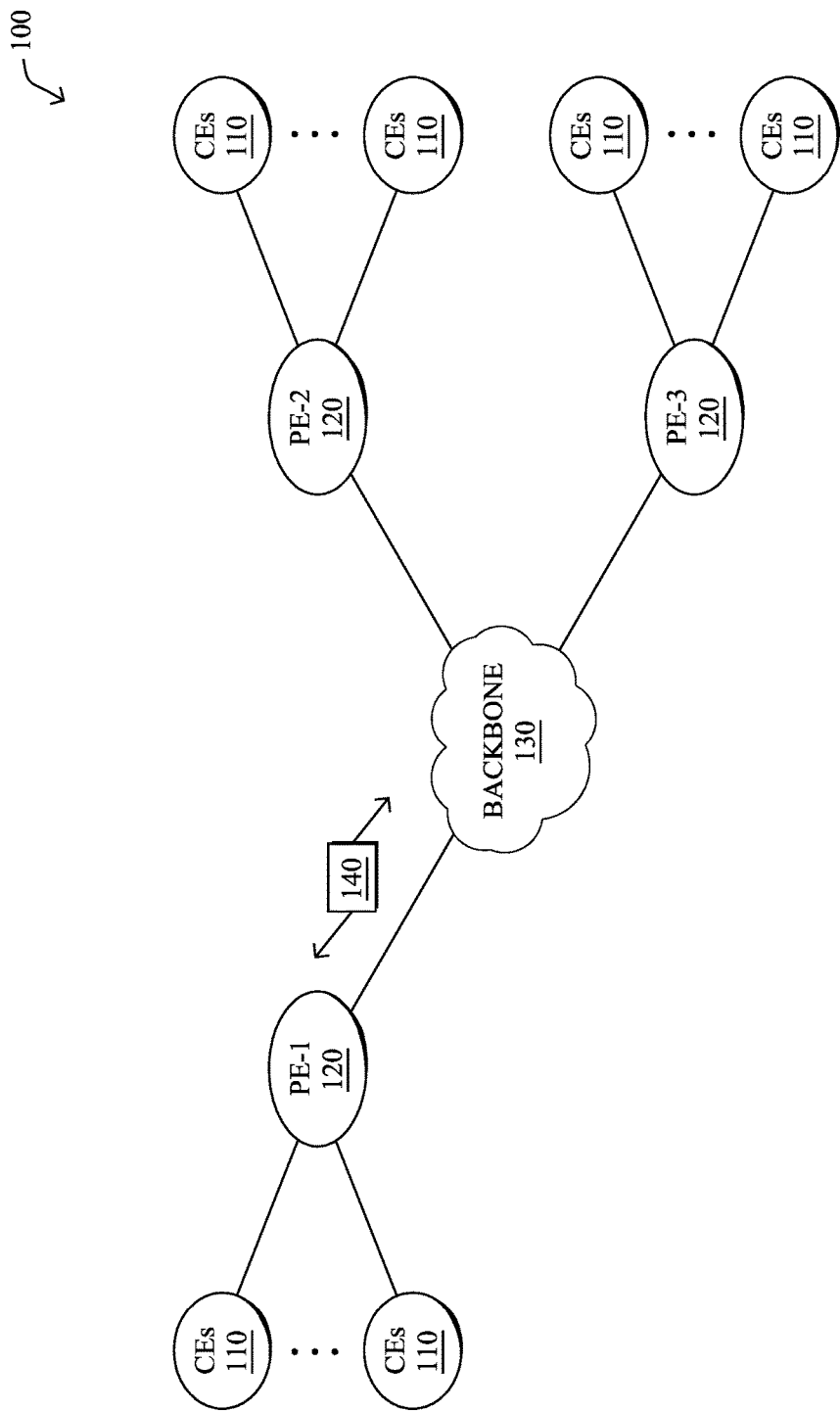
FIGS. 1A-1B illustrate an example communication network.

According to one or more embodiments of the disclosure, a device in a network identifies a plurality of applications from observed traffic in the network. The device forms two or more application clusters from the plurality of applications. Each of the application clusters includes one or more of the applications, and wherein a particular application in the plurality of applications is included in each of the application clusters. The device generates anomaly detection models for each of the application clusters. The device tests the anomaly detection models, to determine a measure of efficacy for each of the models with respect to traffic associated with the particular application. The device selects a particular anomaly detection model to analyze the traffic associated with the particular application based on the measures of efficacy for each of the models.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
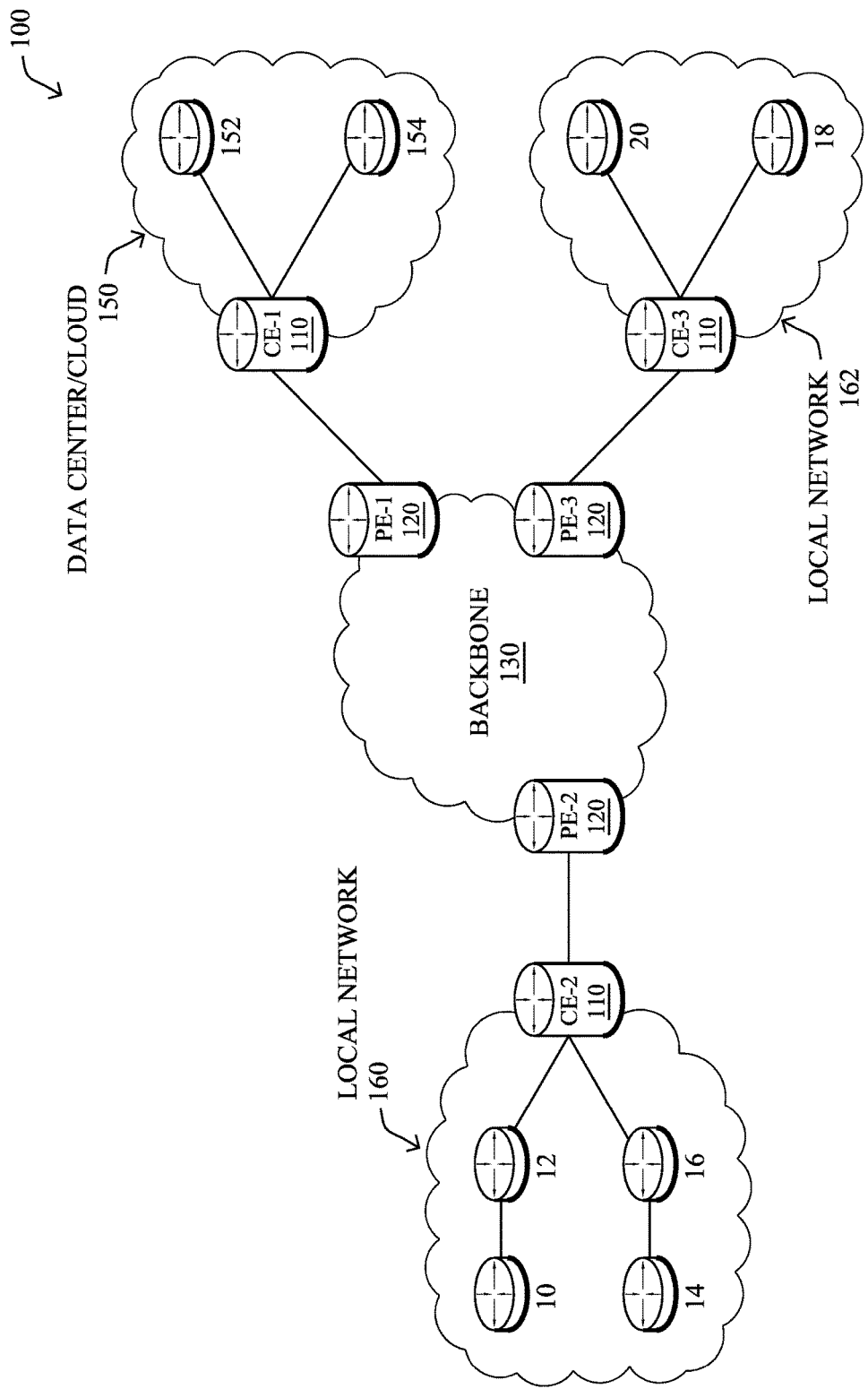

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
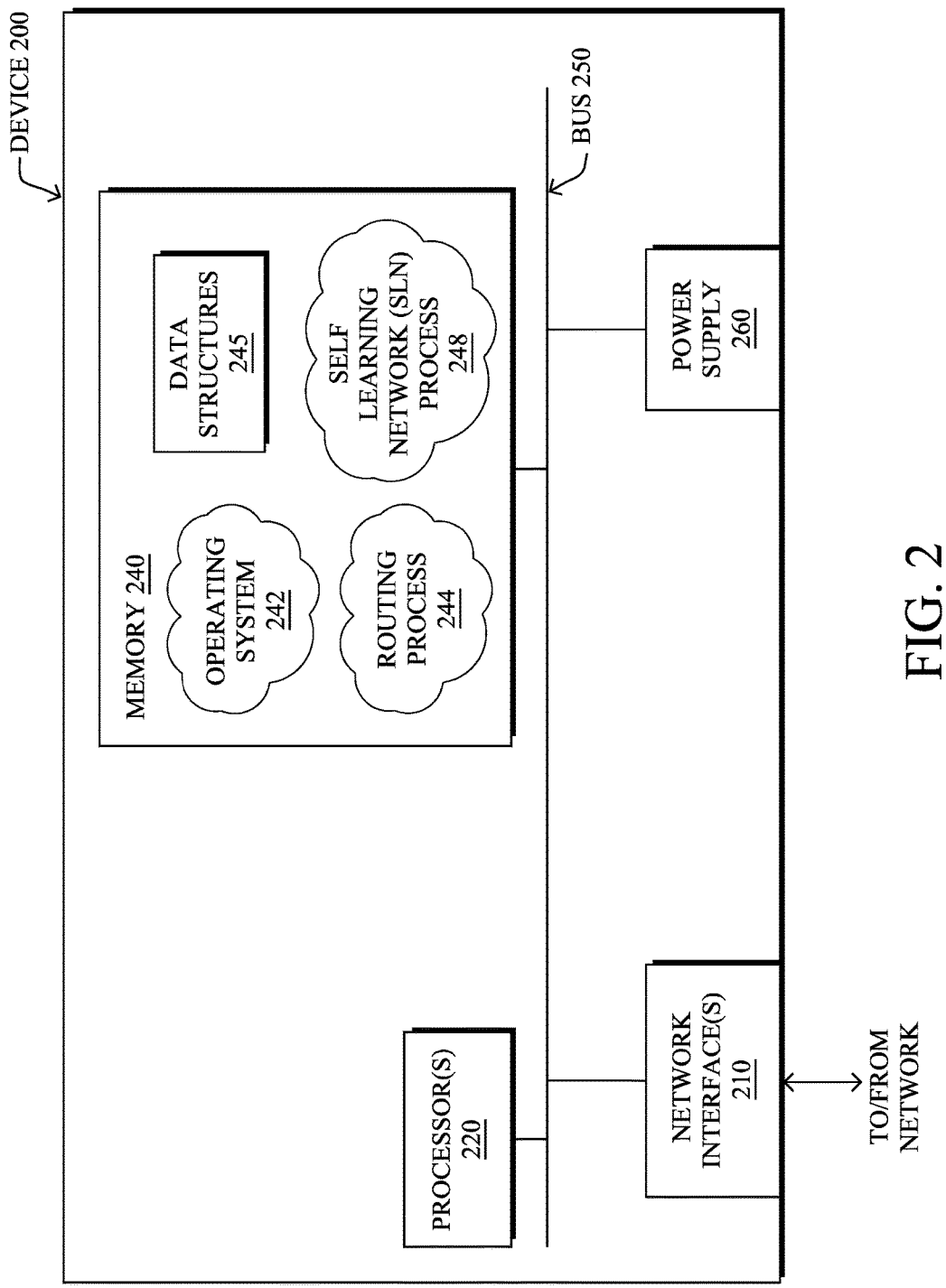
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
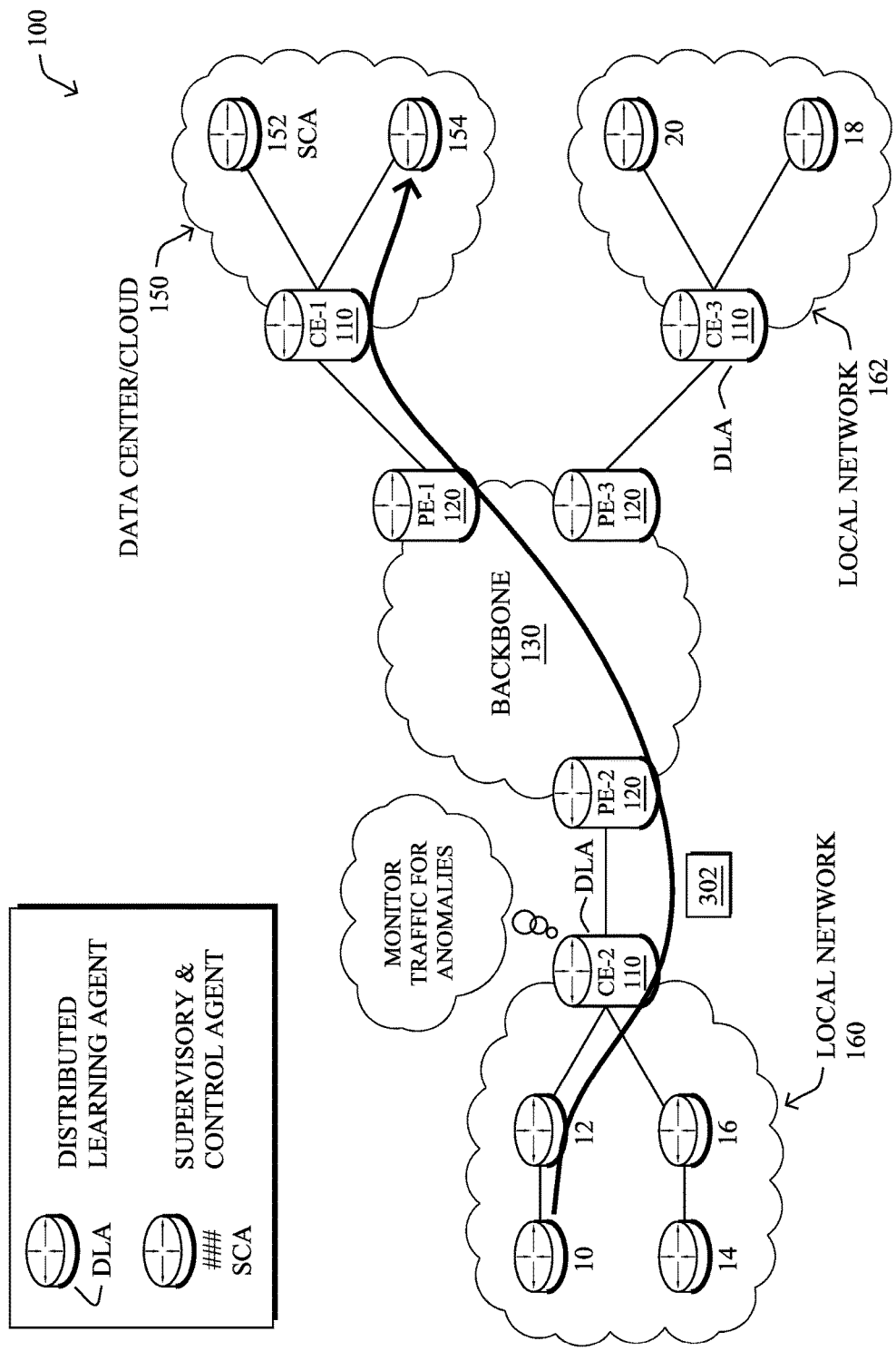
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
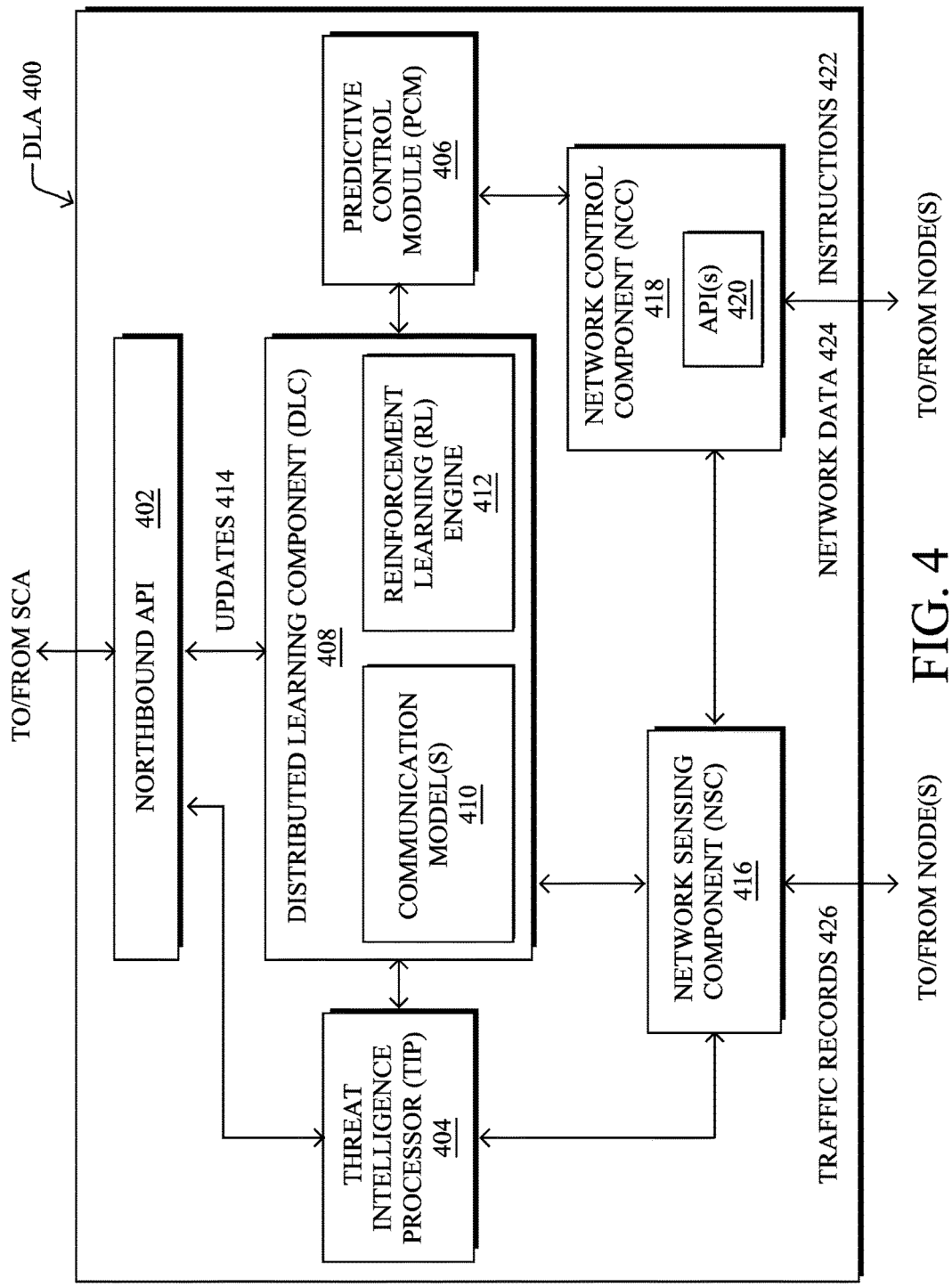
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, behavioral analytics allows for the detection of anomalous network behaviors that are caused by a variety of conditions (e.g., malware, misconfigured devices, etc.). By deploying learning agents deeper in the network, a hosting device is able to observe and flag traffic behaviors that deviate from an expected behavior. However, one challenge to employing a distributed learning system lies in the fact that such devices often have tight resource constraints. This includes computational constraints, memory constraints, as well as infrastructure constraints. As a consequence, care must be given to resource consumption when designing distributed learning systems. This includes considerations related to, for instance, the use of batch vs. online and sequential computations, whether and how to store state information, etc.

In some embodiments, a DLA may employ the use of hierarchical behavioral models, allowing the DLA to assess different behavioral characteristics with different granularity. For example, such a hierarchical model may compare the behavior of a node against that of its peers, globally for a particular application, etc., thereby allowing the DLA to detect different types of anomalies of interest. However, the resource constraints of the hosting device may limit the ability of the device to host every possible model. In one example, the number of possible models may be the number of source clusters times the number of destination clusters times the number of applications used in the network. As would be appreciated, this number can be quite high in many network implementations and is not feasible on many devices due to the resource constrains of the device.

In the specific context of analyzing the behaviors of different applications in a network, the application classification mechanism (e.g., NBAR or the like) may offer a varying degree of granularity with respect to the applications in the network. For example, there may be specific application classifications for various cloud services or a very specific routing protocols classification. From the perspective of a behavioral model, however, increased application granularity may prevent the corresponding model from having a sufficient number of samples. Consequently, the model may have a low degree of confidence, attributable to the highly granular application classification. As an example, consider the case in which the system is able to identify traffic associated with application A and/or the collective set of applications, {A, B, C}. If application A has only a sparse amount of traffic in the network, a behavioral model devoted only to application A may have a far lower degree of confidence than a model based on the set of applications, {A, B, C}.

In some embodiments, a simplistic approach would be to model application traffic in groups, instead of using one model per application. However, doing so also risks mixing applications that have traffic patterns that are too different from one another, thus leading to a higher risk of the model exhibiting false negatives and lower recall. Further, there may be cases in which a single-application model is justified (e.g., sensitive applications, proprietary applications, etc.).

Dynamic Application Degrouping to Optimize Model Accuracy

The techniques herein dynamically perform application grouping/de-grouping for purposes of modeling traffic associated with the applications. Said differently, the techniques herein specify an approach to dynamically determine when applications should be grouped together when building statistical behavioral models, or, conversely, when a given application should be modeled in isolation. In some aspects, the system may evaluate the impact of grouping/degrouping applications using statistical analysis. In further aspects, the system may evaluate the impact based on real-time feedback from a supervisory device that assesses the relevancy of reported anomalies on a per application basis. In further aspects, the techniques herein introduce a method for explicitly signaling a request to model an application in isolation, which can either be triggered by policy or a dynamic signaling architecture such as a threat intelligence feed providing an Index of Compromise (IOC) metric.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, a device in a network identifies a plurality of applications from observed traffic in the network. The device forms two or more application clusters from the plurality of applications. Each of the application clusters includes one or more of the applications, and wherein a particular application in the plurality of applications is included in each of the application clusters. The device generates anomaly detection models for each of the application clusters. The device tests the anomaly detection models, to determine a measure of efficacy for each of the models with respect to traffic associated with the particular application. The device selects a particular anomaly detection model to analyze the traffic associated with the particular application based on the measures of efficacy for each of the models.

Operationally, the techniques herein introduce two approaches to modeling application traffic in a network, as illustrated generally in FIGS. 5A-5F. In a first embodiment, the techniques may take an approach that begins with grouped applications and seek to degroup applications as needed. In a second embodiment, the techniques may take the opposite approach and begin with the independent applications and seek to group applications as needed.

In FIG. 5A, a DLA 400 may receive traffic information 502 (e.g., network data 424, traffic records 426, actual network traffic, etc.) for analysis. In turn, DLA 400 may identify the plurality of applications associated with the traffic observed in the local network of DLA 400 (e.g., based on NBAR or a similar mechanism). Based on this information, DLA 400 may then generate any number of anomaly detection/behavioral analytics models for the various applications.

In some embodiments, DLA 400 may be preconfigured with a set of starting application groups/clusters for which DLA 400 is to construct its anomaly detection models. For example, DLA 400 may use the following NBAR-based application groups:

"www": {spdy, Modbus, http, http-alt, fasttrack, kuro, unknown, binary-over-http, guruguru, SSL, netapp-snapmirror, aol-messenger-ft, secure-http, ghostsurf, megavideo}

"office": {lotus-notes, mailq, nmap, apple-services, smtp, sap, msexch-routing, pop2, dicom, fix, mapi, cvsup, ms-dynamics-crm-online, secure-pop3, nntp, svn, exchange, hl7, distcc, perforce, pop3, activesync, oracle-bi, secure-smtp, imap, qmtp, xns-courier, sharepoint, secure-imap, oracle-ebsuite-unsecured, cvspserver, clearcase}

"cloud": {google-docs, yahoo-mail, salesforce, ms-live-accounts, picasa, skydrive, ms-update, windows-azure, google-services, Hotmail, google-accounts, icloud, yahoo-accounts, dropbox, google-earth, ms-office-365, ms-office-web-apps, outlook-web-service, gmail}

For instance, DLA 400 may assign applications http, binary-over-http, etc. to the "www" application cluster, which will share the same anomaly detection model. In other words, DLA 400 may use the observed traffic associated with any of the applications in this group, to generate and update a single model for the "www" group.

In various embodiments, DLA 400 may split the predefined application clusters dynamically, using a divisive approach. As used herein, degrouping refers to the action of putting a given application alone in an independent cluster (e.g., as opposed to a cluster having a plurality of applications).

The techniques herein generally attempt to optimize resource consumption while considering the overall efficacy of the models. Said differently, the techniques herein may attempt to group as many applications as possible to conserve resources on DLA 400, without sacrificing the detection efficacy of the system (e.g., in terms of recall, etc.). Of note also is that increasing the number of models may affect the maturity of the models, since samples are distributed among a larger number of models, potentially leading to more anomalies. Thus, application grouping should be optimized to allow for the largest number of applications per model, while ensuring a certain level of efficacy.

The proposed approach is based on trial-end-error that first considers a group of N-number of applications. As noted, such application groups/clusters may be preconfigured on DLA 400. For example, the starting groups/clusters may be implemented directly on DLA 400 or sent to DLA 400 from SCA 500 or another device, such as an Application Visibility and Control (AVC) server.

In some cases, DLA 400 may use a-priori statistical metric, to test and compare the efficacies of different application groups. For example, consider the application cluster of {IGRP, OSPG, LDP, syslog} and the degrouped cluster of {syslog}. In such a case, DLA 400 may generate models for both clusters using the observed traffic, to determine whether to assess syslog-related traffic using its own model or the grouped model. In some embodiments, as shown in FIG. 5B, DLA 400 may do so by estimating the regions of the input space that would be considered anomalous by each of the models. If one of the two anomalous regions, which is typically that of the degrouped application (e.g., {syslog}), is included and is significantly larger than that of the other model, DLA 400 may give preference to the former model. This decision procedure is independent of the specifics of the statistical models used, and can be carried out in most settings. This includes density estimator models (e.g., by estimation of the support), coding and sparse coding (e.g., by sampling the input space, and estimating output scores), etc.

Figures 6A, 6B:
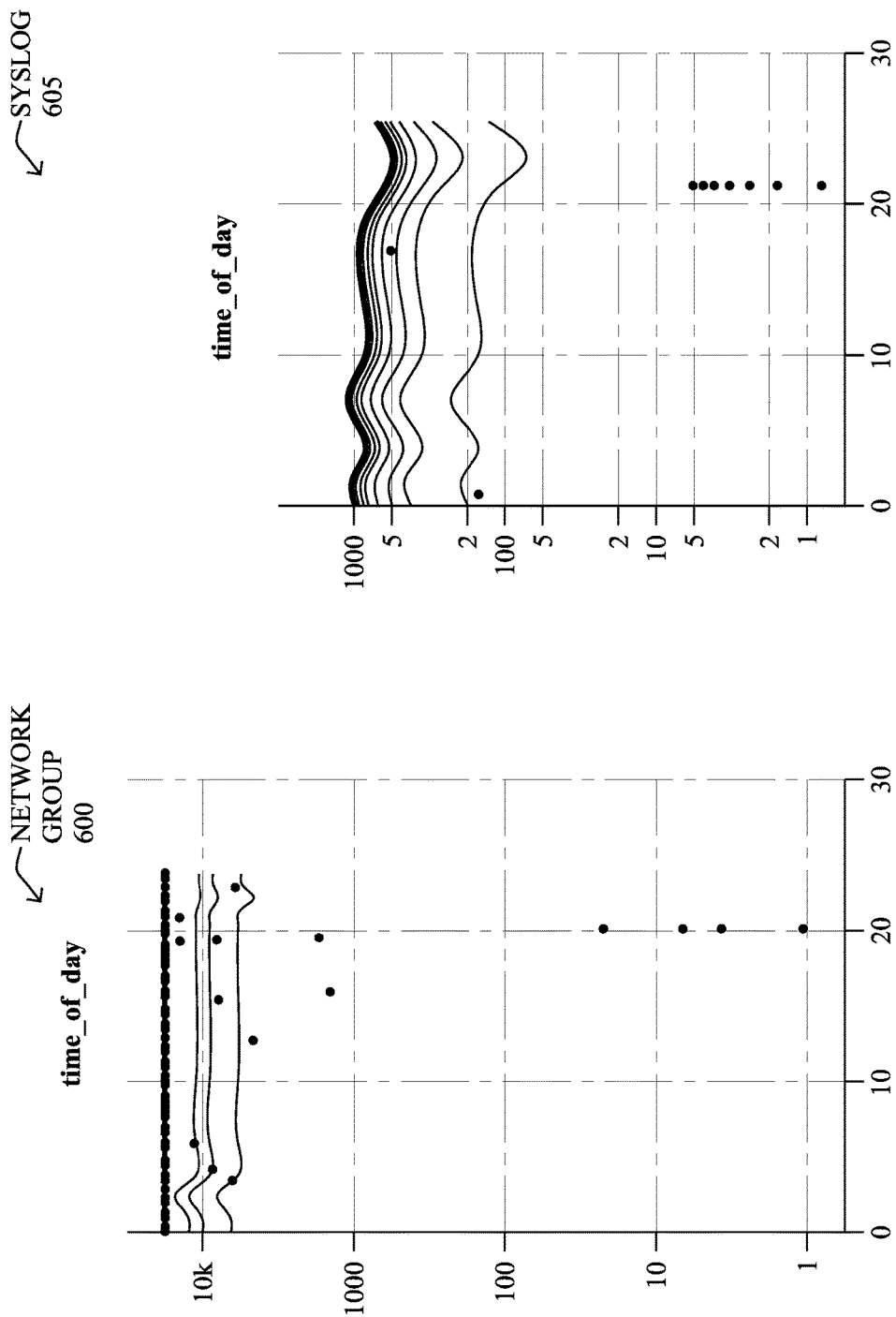
FIGS. 6A-6T illustrate statistical models for an application when grouped and ungrouped.
Figure 6G:
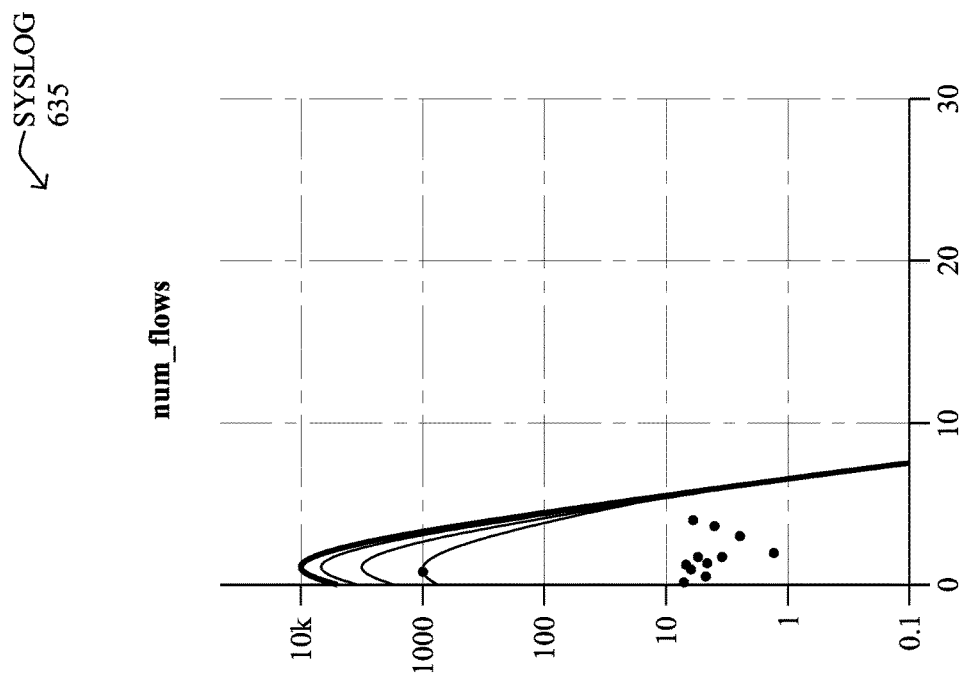
Figure 6H:
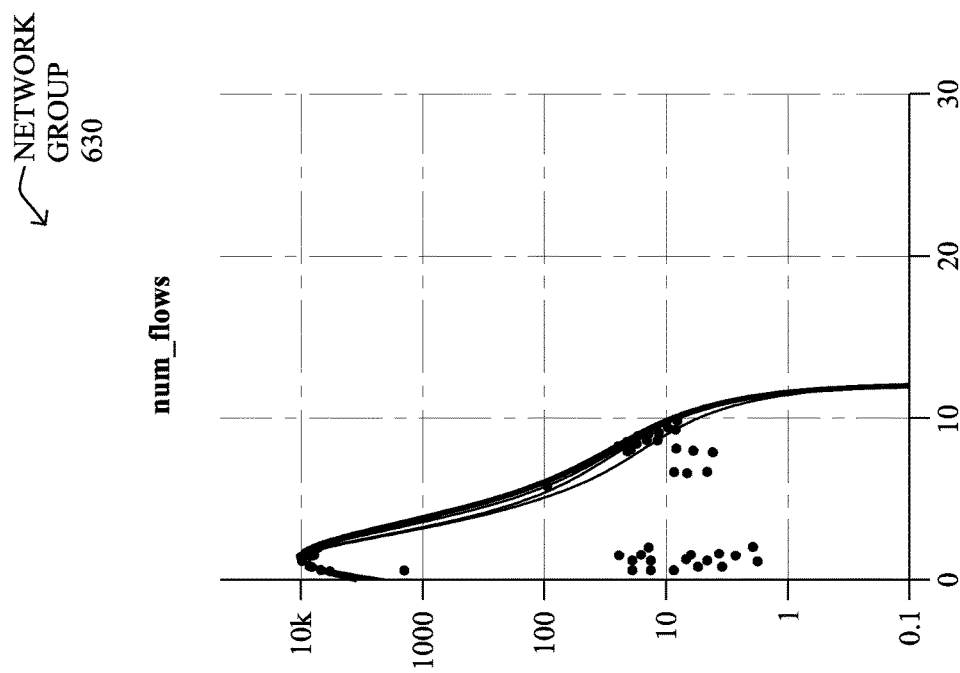
Figures 6K, 6L:
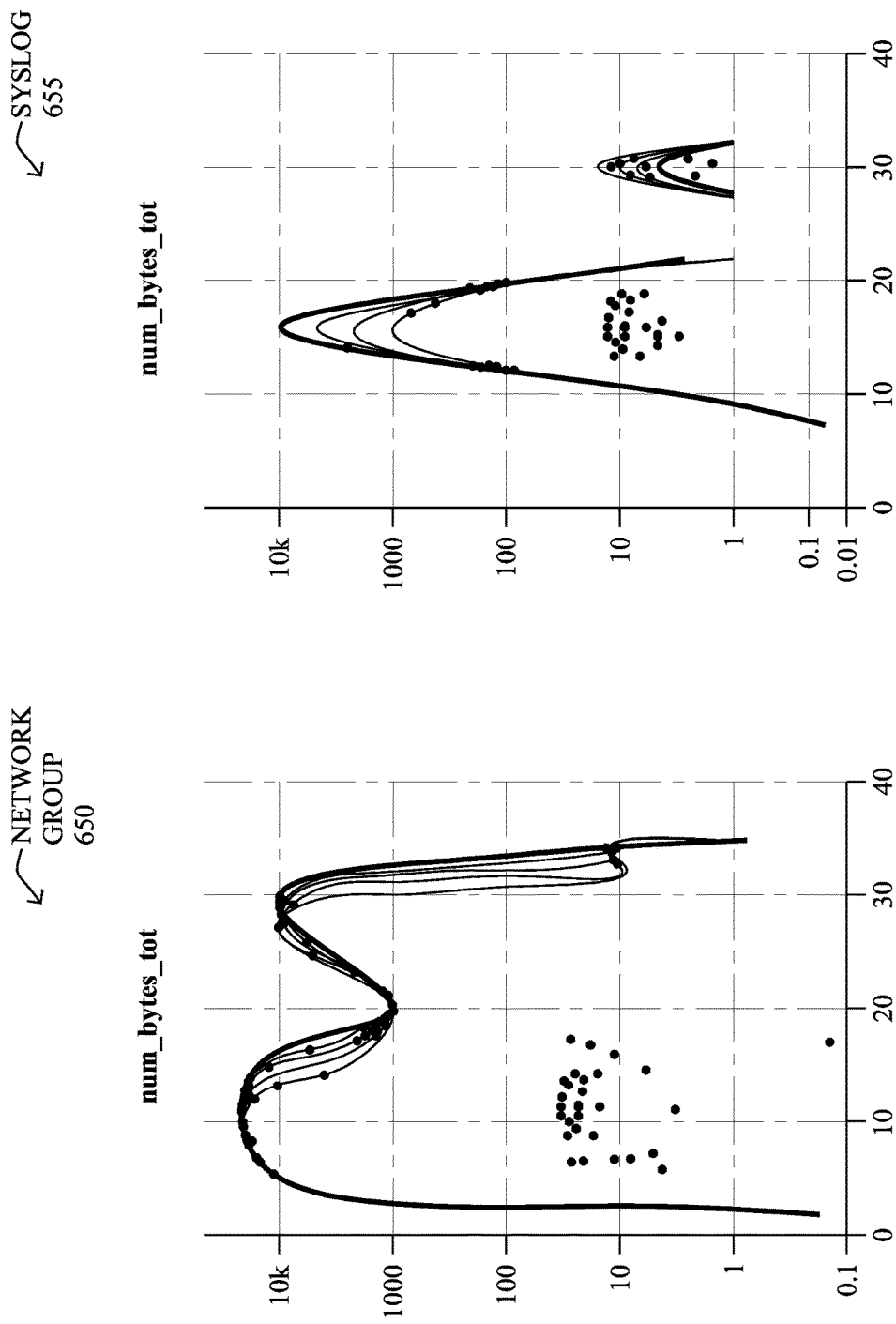
Figures 6M, 6N:
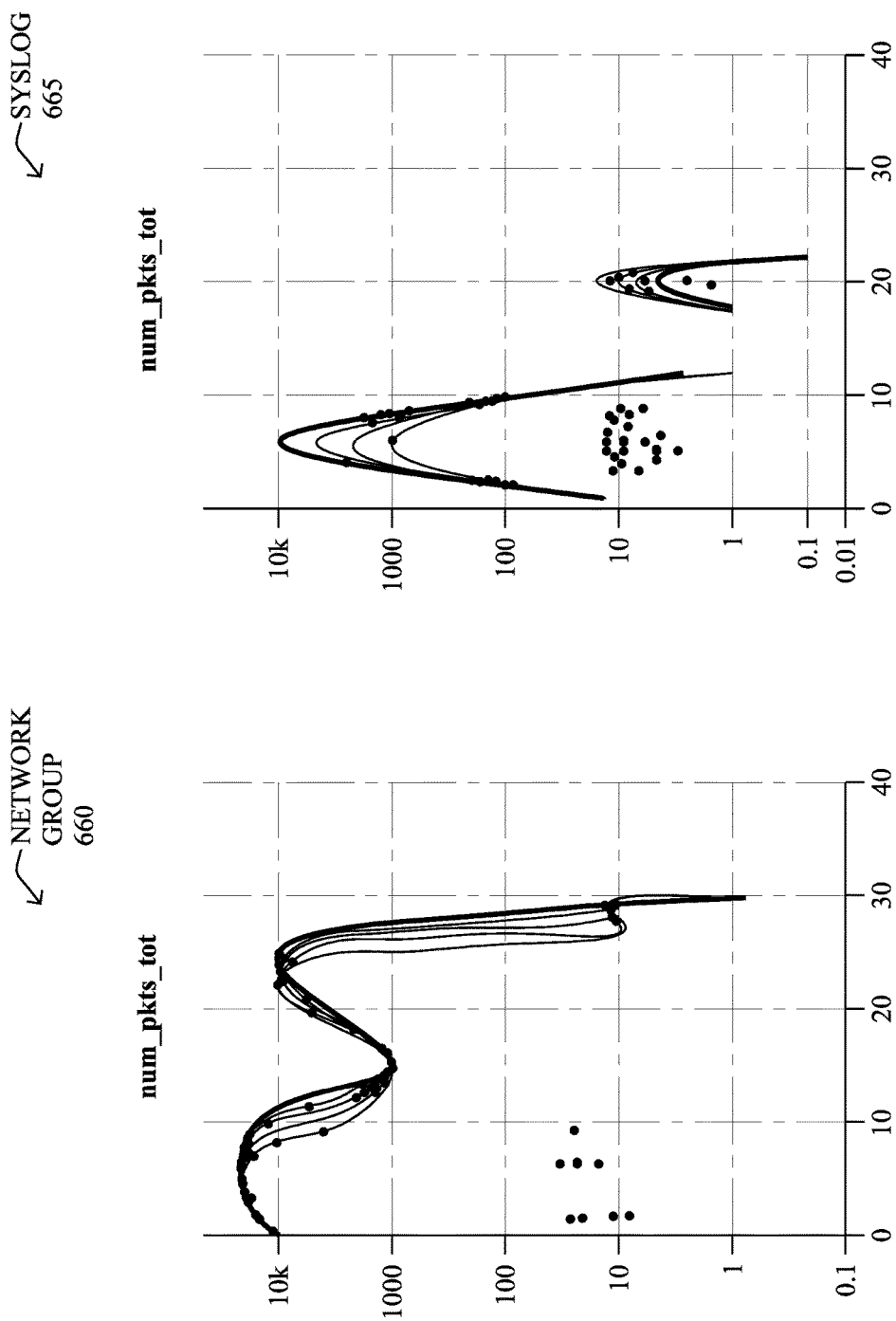
Figures 6O, 6P:
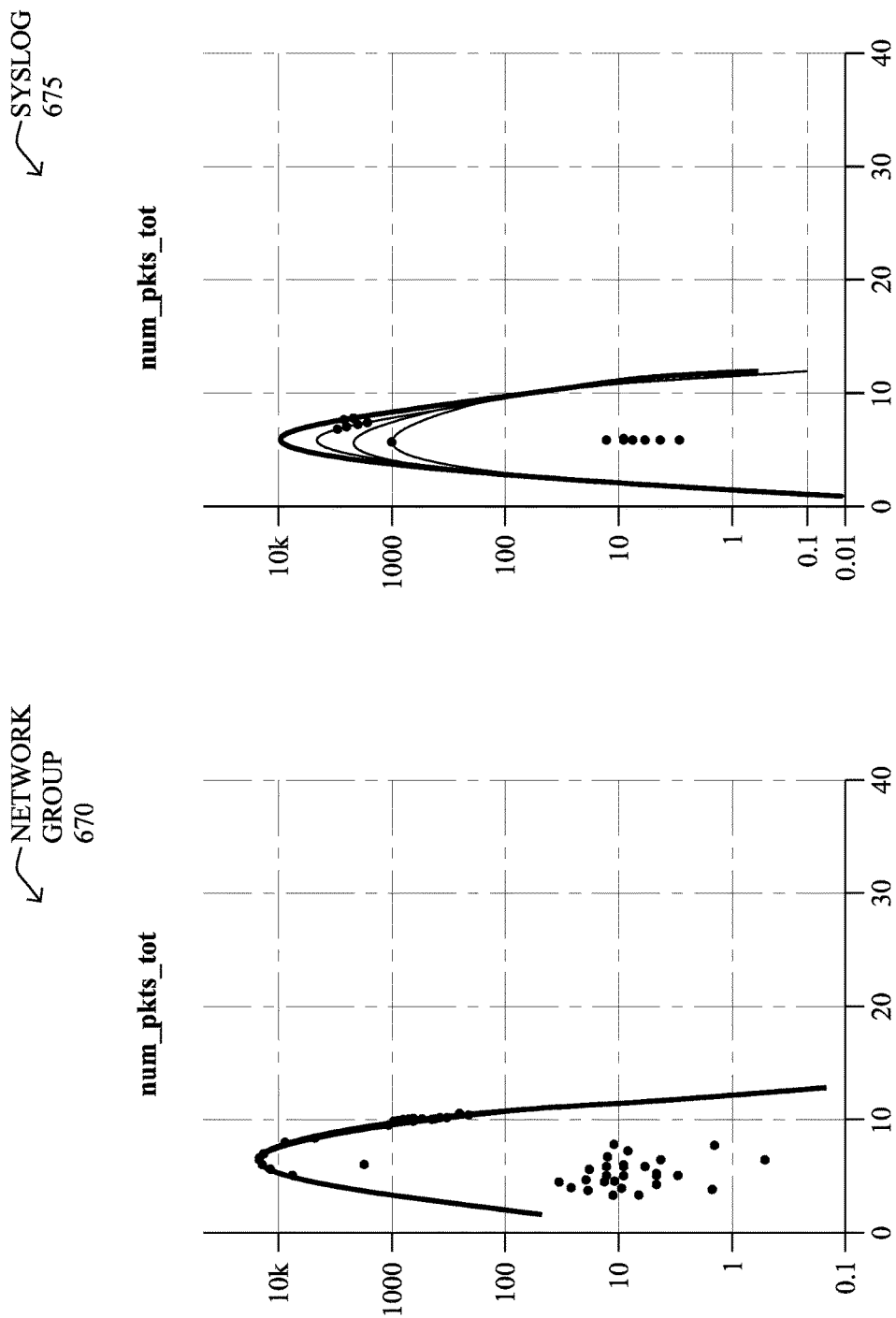
Figure 6R:
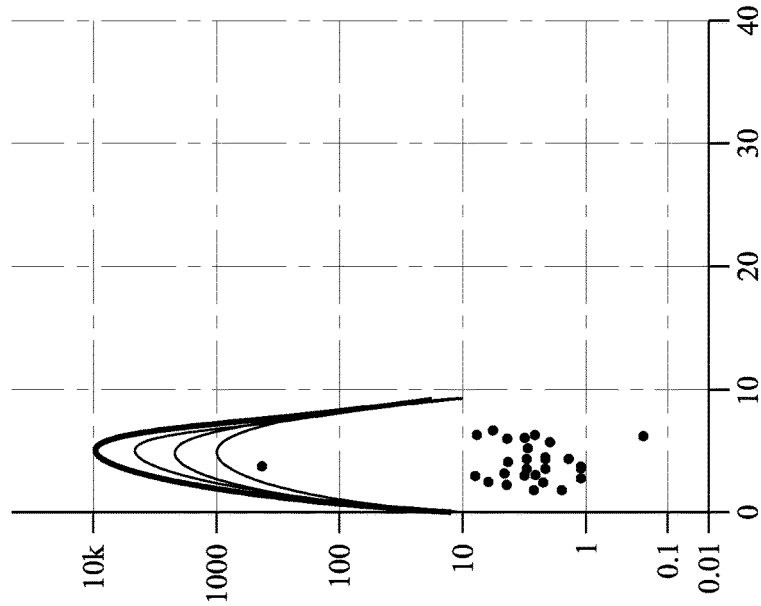
Figure 6Q:
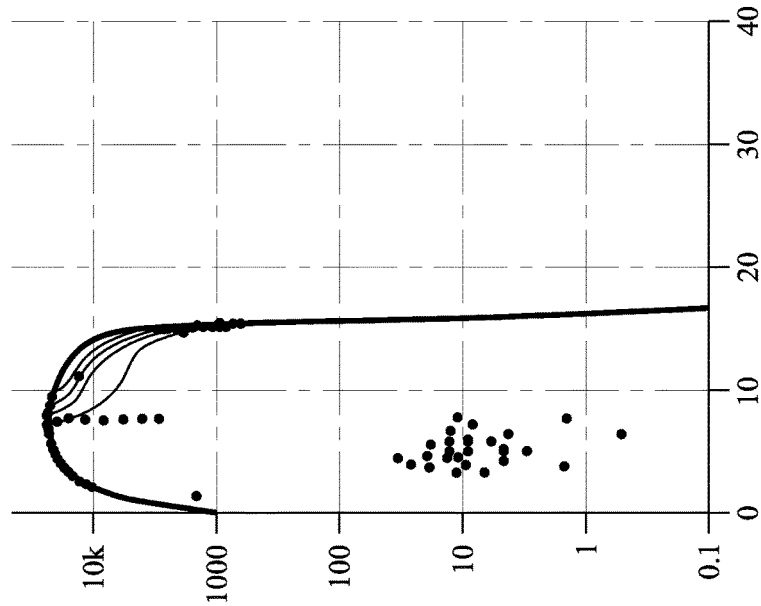
Figure 6T:
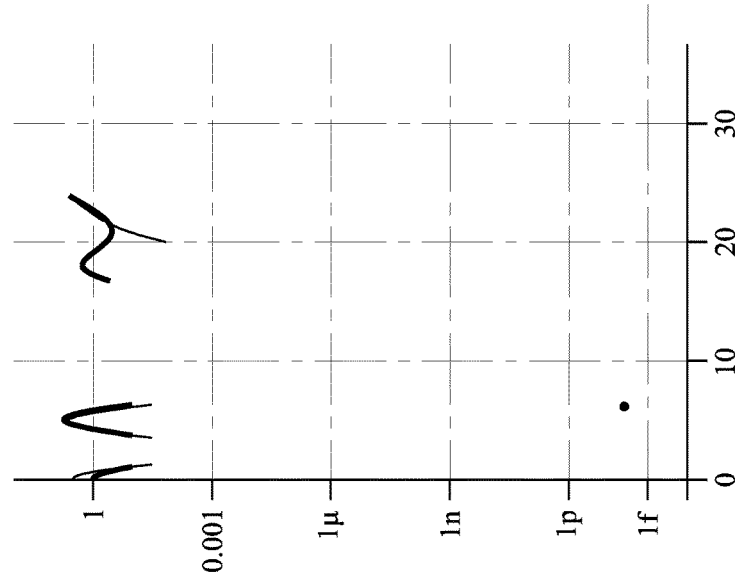
Figure 6S:
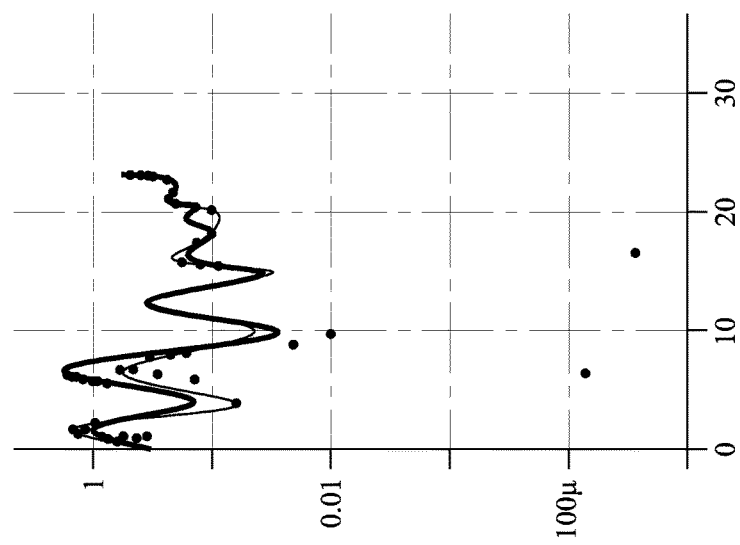

For the sake of illustration, FIGS. 6A-6T illustrate statistical/probabilistic models for the syslog application, both as part of a network application group and in its own application cluster. Notably, models 600, 610, 620, 630, 640, 650, 660, 670, 680, and 690 illustrate probabilistic models for the network application group that includes a plurality of applications including syslog, IGRP, OSPG, LDP, etc. In contrast, models 605, 615, 625, 635, 645, 655, 665, 675, 685, and 695 illustrate probabilistic models for just the syslog application in isolation. Each of the models depicted assesses a different traffic characteristic. Notably, FIGS. 6A-6T illustrate corresponding models for the time of day, number of bytes, number of packets, number of flows, number of new flows, total number of bytes, total number of packets, number of bytes per packet, number of bytes per traffic flow, and time of day of new edges (e.g., flows between new sets of nodes), respectively. The shapes of these models in this test clearly show that mixing applications leads to the models having a larger support and are, thus, less efficient. In such cases, the divisive approach suggests that DLA 400 should use a model that treats traffic associated with the syslog application by itself. Conversely, it can be shown that applications with "similar" behavior can be grouped, as well.

In an alternate approach, DLA 400 may attempt to cluster applications, to determine any behavioral similarities in advance. Unfortunately, this would not necessarily translate into similar modeling outcomes. In opposition to this, the method proposed herein is integrated (e.g., "end-to-end").

In other approaches, DLA 400 may generate a separate model for each application, assuming there are sufficient resources to do so. In turn, DLA 400 may attempt to group applications when appropriate (e.g., when losing information does not result in a significant loss of efficacy). This approach is generally referred to as an agglomerative approach.

In some embodiments, as shown in FIG. 5C, DLA 400 may employ the use of an end-to-end, real-time efficacy signal (RES) 506 from a central controller, such as SCA 500. Such a signal may be based on feedback from a user, in some cases. Note that such a signal may be slow and gathered over the course of a number of anomalies for a given application. For example, DLA 400 may send anomaly alerts 504 to SCA 500 during testing of the models on DLA 400 (e.g., by applying the models to observed traffic, to detect and report the anomalies). In turn, RES 506 may be gathered on a per application basis, to aid in the evaluation of the different anomaly detection models. In some cases, reinforcement learning can be used to compute the relevancy of anomalies, and such a concept can be extended for each application. DLA 400 can then use the received RES 506 to determine the other efficacy impact of regrouping applications. For example, DLA 400 may use hysteresis to dynamically degroup applications, if a decrease in efficacy is detected.

As shown in FIG. 5D, another aspect of the techniques herein relates to the specification of a newly defined unicast/multicast message 508 from SCA 500 to DLA 400 that is used to specifically signal the sensitivity of a given application. Upon receiving such a signal, DLA 400 may decide to degroup the particular application, if sufficient resources are available. If not, DLA 400 may send a negative feedback response 510 back to SCA 500 indicative of its inability to perform such degrouping. In such a case, SCA 500 may flag the corresponding information, to indicate that DLA 400 may not be able to provide the required level of efficacy for a given application.

In another embodiment, the request for degrouping of an application may be dynamically triggered by a third party feed, as shown in FIG. 5E. In some cases, SCA 500 may receive threat intelligence feeds from a platform such as Talos, Threat Grid, etc., to determine an IOC. Based on such a threat intelligence IOC, SCA 500 may send a request 510 to DLA 400 to request the degrouping of a specific application that has been signaled as potentially sensitive, as having a significantly lowered reputation score, etc.

In FIG. 5F, DLA 400 may select a particular anomaly detection model to analyze traffic associated with a particular application. In particular, DLA 400 may compare the efficacies of two or more models for the application, such as a first model that models only the traffic associated with the particular application and another model that models traffic for multiple applications. If, for example, DLA 400 determines that there is no change in the efficacy or the change is below an acceptable threshold, DLA 400 may favor using a model that models multiple applications, to conserve resources. Such efficacy can be measured, for example, by comparing the input spaces of the models, based on an efficacy signal from SCA 500 or another supervisory device, or the like.

Figure 7:
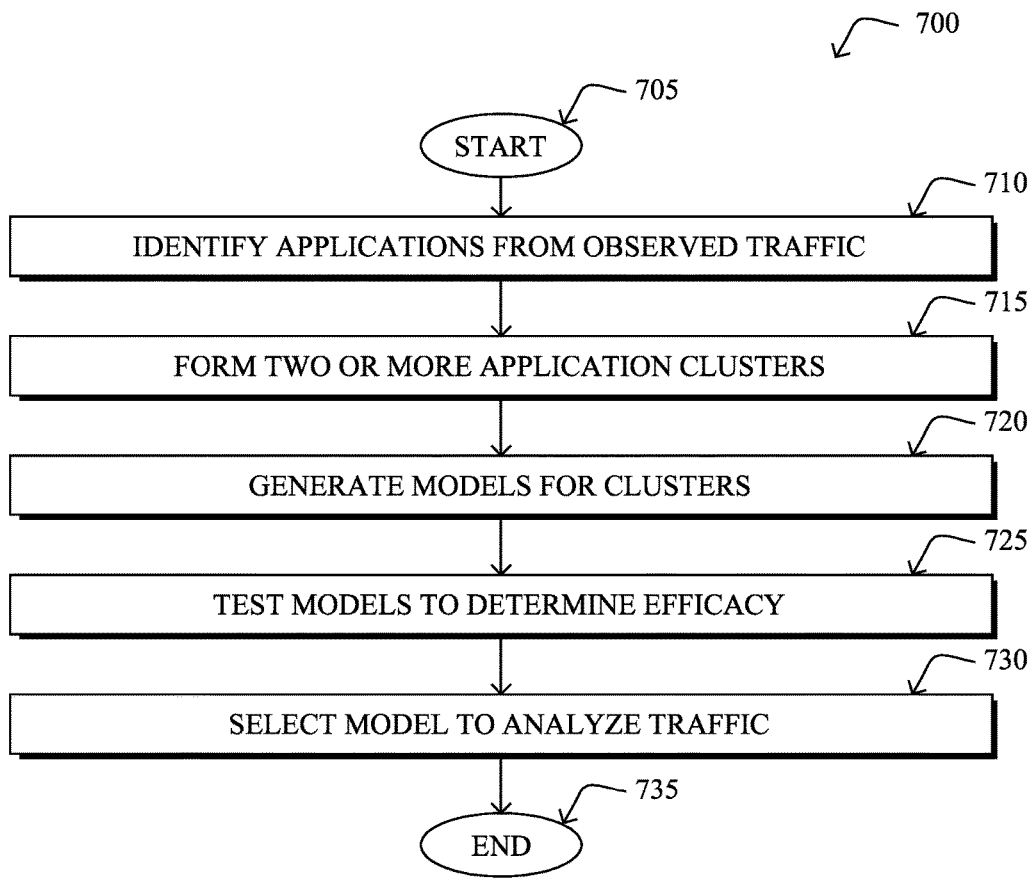
FIG. 7 illustrates an example simplified procedure for selecting an anomaly detection model.

FIG. 7 illustrates an example simplified procedure for selecting an anomaly detection model. In many cases, procedure 700 may be performed by a non-generic, specifically configured device in a network (e.g., an edge router or other device, etc.) by executing stored instructions. Procedure 700 may start at step 705 and continues on to step 710 where, as described in greater detail above, the device may identify a plurality of applications from observed traffic in the network. For example, the device may rely on NBAR or a similar application-sensing mechanism, to identify the applications associated with the network traffic.

At step 715, as detailed above, the device may form two or more application clusters from the identified applications. In various embodiments, each of the two or more application clusters may comprise a particular application. For example, one of the clusters may include the particular application as a standalone application, while another of the clusters may include the particular application as part of a group of applications.

At step 720, the device may generate models for the application clusters, as described in greater detail above. In some embodiments, the models may be behavioral/anomaly detection models that are able to identify when traffic associated with the corresponding application(s) is behaving anomalously. For example, the models may be statistical models or any other type of machine learning model that compares new traffic samples to an expected baseline behavior. In some cases, the models may be hierarchical models comprising a plurality of models that evaluate different characteristics of the traffic (e.g., packet size, flow duration, etc.).

At step 725, as detailed above, the device may test each of the models to determine a measure of efficacy. In some embodiments, the device may compare the input spaces of the models, to determine an amount of overlap in the inputs that the different models would consider anomalous. In other embodiments, the device may receive an efficacy signal from a supervisory device, in response to using the models on observed traffic. For example, the supervisory device may evaluate any reported anomalies from the models in terms of relevancy, etc., and provide feedback to the device regarding the different models.

At step 730, the device may select one of the models to analyze observed traffic associated with the particular application, as described in greater detail above. In some embodiments, the device may give preference to a model that models a plurality of applications over the model that models only the particular application, if there is not a significant difference in the efficacies of the models. In further embodiments, the device may select the model for just the particular application, such as when there would be a significant drop in efficacy otherwise, in response to a request to do so from a supervisory device (e.g., based on a threat intelligence feed, etc.), or the like. Procedure 700 then ends at step 735.

The techniques described herein, therefore, provide for dynamic application degrouping to optimize machine learning model accuracy. In particular, the techniques herein simplify the configuration task for distributed learning agents and allow for optimizing the overall efficacy of models while preserving local resources. For instance, according to the techniques herein, modelling of traffic can be simplified by aggregating applications into application groups where each member is supposed to show a similar behavior, and such groups can be dynamically created by observing the actual behavior of each application and dynamically performing aggregation. Indeed, for most applications, there may be insufficient traffic to build accurate models, and as such, aggregation of these applications into meaningful groups can prove to be very helpful in model generation.

While there have been shown and described illustrative embodiments that provide for dynamic application degrouping to optimize machine learning model accuracy, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    identifying, by a device in a network, a plurality of applications from observed traffic in the network;
    forming, by the device, two or more application clusters from the plurality of applications, wherein each of the application clusters includes one or more of the applications, and wherein a particular application in the plurality of applications is included in each of the application clusters;
    generating, by the device, anomaly detection models for each of the application clusters;
    testing, by the device, the anomaly detection models, to determine a measure of efficacy for each of the models with respect to traffic associated with the particular application; and
    selecting, by the device, a particular anomaly detection model to analyze the traffic associated with the particular application based on the measures of efficacy for each of the models.

2. The method as in claim 1, wherein testing the anomaly detection models comprises:
    determining, for each of the anomaly detection models, the measure of efficacy of the model based in part on an estimated set of inputs that the model would deem anomalous.

3. The method as in claim 2, wherein the selected anomaly detection model is selected based in part on an amount of overlap between the estimated sets of inputs that each of the anomaly detection models would deem anomalous.

4. The method as in claim 3, wherein the selected anomaly detection model models the traffic associated with the particular application and traffic associated with at least one other application.

5. The method as in claim 1, wherein testing the anomaly detection models comprises:
    using the anomaly detection models to detect anomalous traffic; and
    reporting the detected anomalous traffic to a supervisory device.

6. The method as in claim 5, wherein the measures of efficacy comprise feedback from the supervisory device regarding the reported anomalous traffic.

7. The method as in claim 1, further comprising:
    receiving, at the device, a request from a supervisory device to use a separate anomaly detection model for the traffic associated with the particular application;
    determining, by the device, whether the device has sufficient resource to execute a separate anomaly detection model for the traffic associated with the particular application; and
    notifying, by the device, the supervisory device when there are not sufficient resources on the device to execute a separate anomaly detection model for the traffic associated with the particular application.

8. The method as in claim 7, wherein the request to use a separate anomaly detection model for the traffic associated with the particular application is sent by the supervisory device based in part on a threat intelligence index of compromise.

9. The method as in claim 1, wherein the anomaly detection models are statistical behavioral models.

10. An apparatus, comprising:
one or more network interfaces to communicate with a network;
a processor coupled to the network interfaces and configured to execute one or more processes; and
a memory configured to store a process executable by the processor, the process when executed configured to:
identify a plurality of applications from observed traffic in the network;
form two or more application clusters from the plurality of applications, wherein each of the application clusters includes one or more of the applications, and wherein a particular application in the plurality of applications is included in each of the application clusters;
generate anomaly detection models for each of the application clusters;
test the anomaly detection models, to determine a measure of efficacy for each of the models with respect to traffic associated with the particular application; and
select a particular anomaly detection model to analyze the traffic associated with the particular application based on the measures of efficacy for each of the models.

11. The apparatus as in claim 10, wherein the apparatus tests the anomaly detection models by:
determining, for each of the anomaly detection models, the measure of efficacy of the model based in part on an estimated set of inputs that the model would deem anomalous.

12. The apparatus as in claim 11, wherein the apparatus selects the selected anomaly detection model based in part on an amount of overlap between the estimated sets of inputs that each of the anomaly detection models would deem anomalous.

13. The apparatus as in claim 12, wherein the selected anomaly detection model models the traffic associated with the particular application and traffic associated with at least one other application.

14. The apparatus as in claim 10, wherein the apparatus tests the anomaly detection models by:
using the anomaly detection models to detect anomalous traffic; and
reporting the detected anomalous traffic to a supervisory device.

15. The apparatus as in claim 14, wherein the measures of efficacy comprise feedback from the supervisory device regarding the reported anomalous traffic.

16. The apparatus as in claim 10, wherein the process when executed is further operable to:
receive a request from a supervisory device to use a separate anomaly detection model for the traffic associated with the particular application;
determine whether the apparatus has sufficient resource to execute a separate anomaly detection model for the traffic associated with the particular application; and
notify the supervisory device when there are not sufficient resources on the apparatus to execute a separate anomaly detection model for the traffic associated with the particular application.

17. The apparatus as in claim 16, wherein the request to use a separate anomaly detection model for the traffic associated with the particular application is sent by the supervisory device based in part on a threat intelligence index of compromise.

18. The apparatus as in claim 10, wherein the anomaly detection models are statistical behavioral models.

19. A tangible, non-transitory, computer-readable medium storing program instructions that cause a device in a network to execute a process comprising:
identifying, by the, a plurality of applications from observed traffic in the network;
forming, by the device, two or more application clusters from the plurality of applications, wherein each of the application clusters includes one or more of the applications, and wherein a particular application in the plurality of applications is included in each of the application clusters;
generating, by the device, anomaly detection models for each of the application clusters;
testing, by the device, the anomaly detection models, to determine a measure of efficacy for each of the models with respect to traffic associated with the particular application; and
selecting, by the device, a particular anomaly detection model to analyze the traffic associated with the particular application based on the measures of efficacy for each of the models.

20. The tangible, non-transitory, computer-readable medium as in claim 19, wherein the anomaly detection models are statistical behavioral models.

* * * * *